Figure 7:
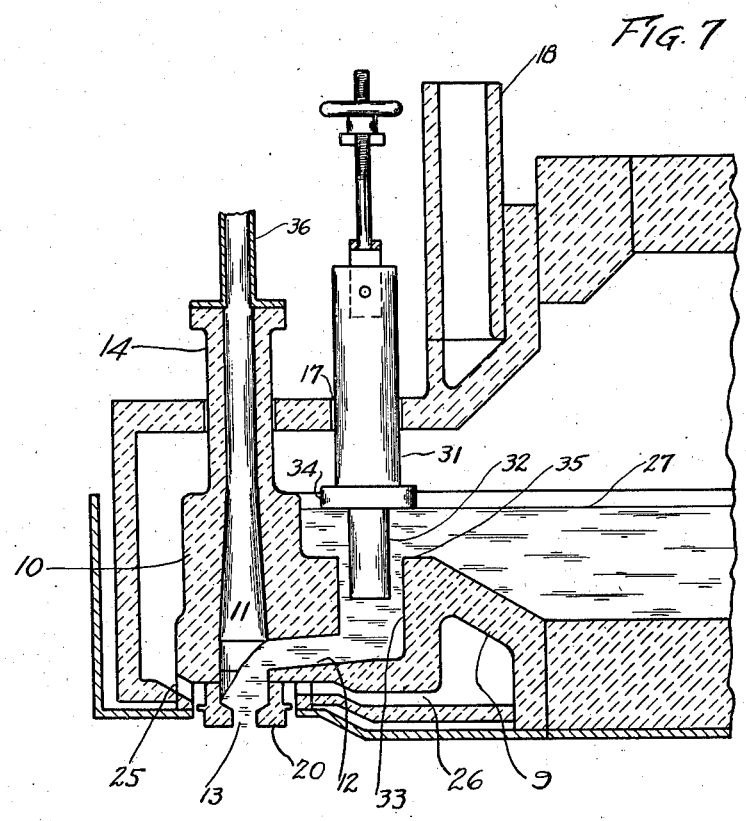

Oct. 20, 1936.    G. R. HAUB    2,058,149
VACUUM FEEDER
Filed Oct. 27, 1932    3 Sheets-Sheet 1
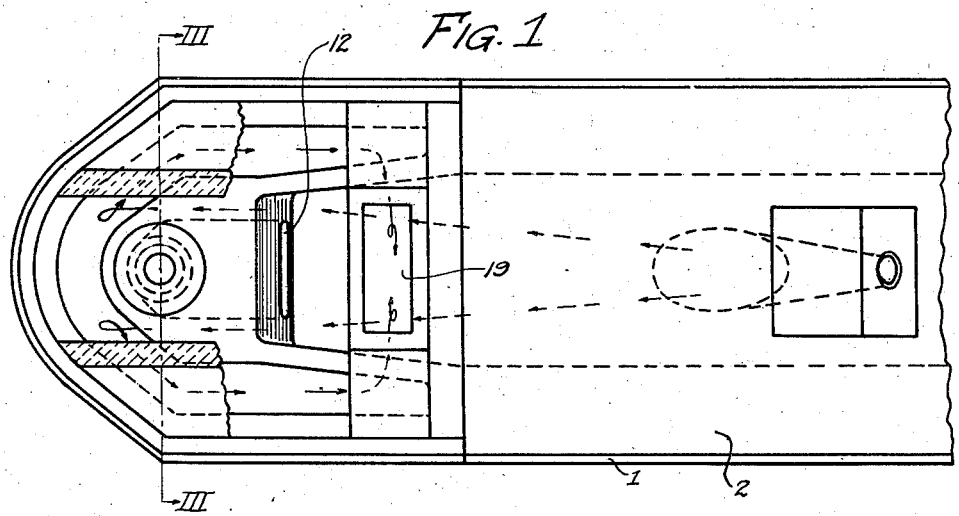
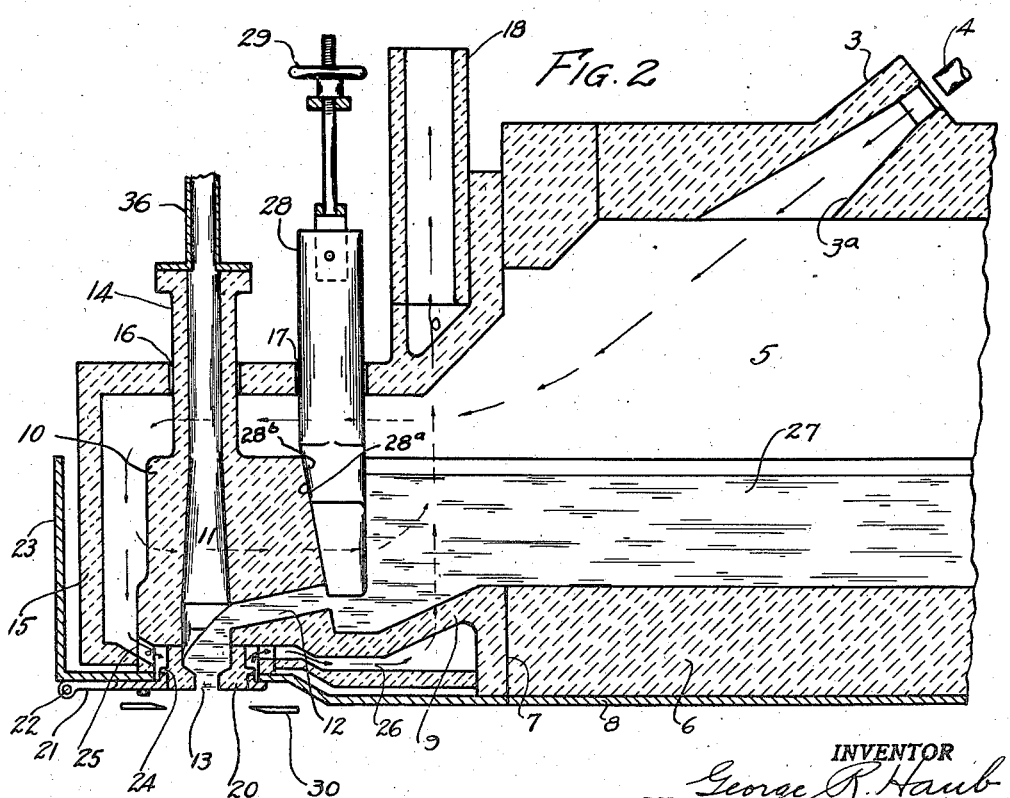
INVENTOR
George R. Haub
BY William B. Jasper
ATTORNEY Oct. 20, 1936.     G. R. HAUB     2,058,149
VACUUM FEEDER
Filed Oct. 27, 1932     3 Sheets-Sheet 2
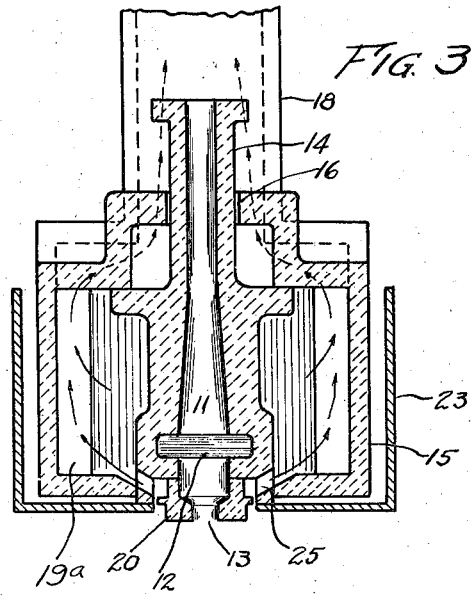
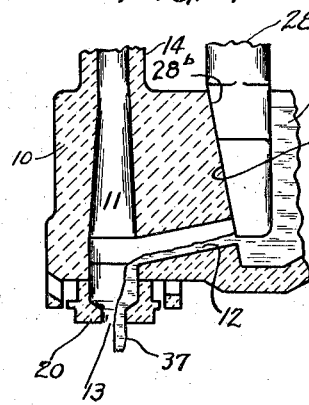 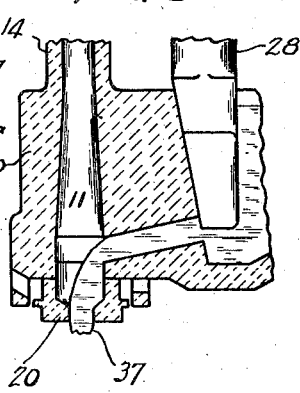 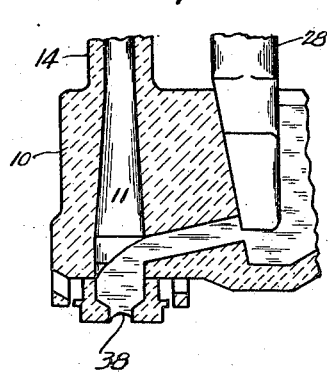
INVENTOR
George R Haub
BY William B. Jaspert
ATTORNEY Oct. 20, 1936.    G. R. HAUB    2,058,149
VACUUM FEEDER
Filed Oct. 27, 1932    3 Sheets-Sheet 3

INVENTOR
George R. Haub
BY William B. Jaspert
ATTORNEY

Patented Oct. 20, 1936

2,058,149

UNITED STATES PATENT OFFICE 2,058,149

VACUUM FEEDER

George R. Haub, Pittsburgh, Pa., assignor to Shawkee Manufacturing Company, Pittsburgh, Pa., a corporation of Pennsylvania Application October 27, 1932, Serial No. 639,820

5 Claims. (Cl. 49—55)

This invention relates to a method of and apparatus for segregating mold charges from a mass of molten glass, and the present application is a continuation in part of my copending application bearing Serial Number 595,101 filed February 25, 1932, for Glass feeding apparatus.

In the application referred to, I have shown a glass feeding apparatus which utilizes an impulse chamber in which glass is caused to flow and from which it is extruded in successive gobs that are sheared off after they are formed below the discharge orifice, and in said application I have particularly featured the mechanism for supplying successive impulses to the glass in the feeding chamber.

The present application is directed to a method of controlling the glass flow to the feeding chamber employing means in addition to the impulse producing and controlling means, and it is among the objects thereof to provide apparatus which shall be capable of gathering, forming and segregating mold charges by apparatus requiring few and simple adjustments, and which shall be adapted to maintain the uniformity of the shape and weight of the segregated gob once the device has been set.

A further object of the invention is the provision of means whereby the weight and shape of a gob are primarily controlled by the size of the discharge orifice without requiring the precise adjustments and operations of the impulse mechanism as has been the object of all prior feeding implements of the pneumatic type.

Still a further object of the invention is the provision of means for varying the weight of the gob while maintaining the impulse pressures at substantially constant values.

The present invention is an improvement on the patents to Hitchcock #805,067 and #805,068 granted November 21, 1905, disclosing a feeding chamber having a discharge outlet or feeding orifice, a glass flow passage communicating with a source of molten glass, and pressure impulse mechanism for supplying impulses to the glass in the feeding chamber to subject the glass to a surging movement whereby portions were extruded for severance at the discharge orifice, and the stub of glass from which the gob was severed is drawn back into the feeding chamber.

One of the difficulties encountered in the operation of the Hitchcock feeder was a tendency toward the filling of the feeding chamber with glass which, if it occurred, rendered the impulses ineffective on the glass in the region of the discharge orifice.

While the present invention utilizes the vertical chamber and the horizontal glass delivery passage of the Hitchcock feeder, provision is made for rendering the impulses of vacuum and pressure more effective at the discharge orifice than in the Hitchcock feeder, because there, a relatively large volume of glass is subjected to the effect of the impulses and the proportion and location of the passages is such that the effect of the impulses is to some extent dissipated. I employ a relatively small feeding or gathering chamber and a relatively large impulse chamber and I so locate and proportion the glass delivery passages that substantially the entire force of each impulse is rendered effective at the discharge orifice, and I thus obtain a more positive control of the glass throughout the entire feeding operation, and I am therefore able to maintain the desired size of the successive gobs or charges of glass delivered by the feeder even under such variations of operating conditions as are bound to occur.

This construction confines the impulses of pressure and vacuum so that they act upon a minimum volume of glass above the discharge orifice which provides absolute control of the shape and weight of the gob.

The invention will become more apparent from a consideration of the accompanying drawings constituting a part hereof in which like reference characters designate like parts and in which:

Figure 1 is a top plan view of a feeder boot and flow channel illustrating a feeding chamber and control embodying the principles of this invention;

Figure 2 a vertical longitudinal cross-sectional view of the boot and forehearth structure;

Figure 3 a cross-sectional view taken along the lines III—III, Figure 1;

Figures 4, 5 and 6, vertical sectional views of the feeding chamber graphically illustrating the working of the glass in said chamber; and, Figure 7 a vertical longitudinal cross-section of the feeder boot and a portion of the forehearth showing a modified form of feeding device.

In the drawings, the reference numeral 1 designates the side walls of a forehearth structure; 2, the cover or roof having a burner block or port 3 therein for the insertion of a fuel nozzle 4 which projects a hot flame into the heating chamber 5 of the forehearth. The hearth is provided with a hearth block 6 which terminates at 7 and is protected as are the side walls 1 with metal sheeting 8.

A feeder boot generally designated by the reference numeral 9 is disposed adjacent the end 7 of the hearth block 6 and consists mainly of a solid refractory block 10 having a vertical passage 11 hereinafter designated the feeding chamber, an inclined passage 12 hereinafter referred to as the inlet passage to the feeding chamber 11, and an outlet 13 hereinafter designated the feeding orifice. Block 10 has a vertical extension 14 which may be integrally formed as shown or which may be a separate sleeve member attached to the block 10, the extension 14 having a passage constituting an extension of the feeding chamber 11.

The block 10 is housed within a wall generally designated by the reference numeral 15 which surrounds the block 10 and is provided with openings 16 and 17 in the top thereof. Also, the wall 15 has a stack or flue 18 at the top thereof with a passage 19 shown in Figure 1 communicating with the space 19a surrounding the block 10 which constitutes the space a divided passage for the hot gases which are directed with considerable velocity through the burner port 3a as shown by the arrows in Figure 2 of the drawings. Cooperating with the feeding chamber 11 is a refractory bushing 20 which is mounted on a hinge member or bracket 21 that is hinged at 22 to a metal casting 23 that surrounds the wall 15, and the bushing 20 is supported in the bracket by a flange 24 or in any other suitable manner to render them readily removable for the purpose hereinafter stated.

The hinge bracket 21 is adapted to fit snugly against the casting 23 to close a passage 25 that communicates with the space between the wall 15 and the front of the feeder boot, the passage 25 completely enveloping the bushing 20 and continuing at 26 below the inflow passage 12 from which it enters the stack opening 19 referred to in Figure 1.

By so constructing the orifice ring 20 and providing the passages 25 and 26, the heat from the burner port 3a is conducted to the front of the boot passing partly around the side walls thereof as shown by arrows in Figure 2, and partly downwardly through the passages 25 around the orifice ring 20, thence below the feed passage 12 and upwardly through passage 19 of the stack 18. In this manner, the glass flowing to the chamber 11 and the glass in the orifice ring 20 is heated to maintain the glass flowing to and from the feeding chamber at a constant uniform temperature thereby eliminating one of the disturbing factors which, in devices where such heating was not provided for, was the source of constant trouble.

The supply passage 12, through which the glass 27 from the forehearth 6 is fed to the feeding chamber 11, is a relatively narrow and flat passage in close proximity with the discharge outlet 13, and provisions are made for controlling the flow of the glass through the inlet passage 12 by means of a gate 28 which is disposed in the opening 17 and which is adjustable by means of a hand wheel 29 to raise and lower the gate in accordance with the degree of opening required at the end of the passage 12. Gate 28 is provided with a flat tapered side 28a which provides a large seating area on the complementary shaped side 28b of the feeder block 10 so that the head of the glass 27 acting upon the gate 28 will securely hold it in its adjusted positions.

As shown in Figure 1, the passage 12 is relatively narrow and wide, it being shown of the same or greater width than the diameter of the feeding chamber 11, and the purpose of so providing a narrow and wide slot is to produce a maximum area of flow passage a minimum distance from the feeding orifice 13 as obviously if the passage 12 for the same area were of circular form, the top of the passage would be spaced further away from the discharge orifice 13. The feeding passage 12 is shown on a level with the planed glass at the bottom of the forehearth 6, it being disposed below the top of hearth 6 which assures a constant supply of glass of uniform quality.

The usual and conventional form of cutting shears 30 are provided below the orifice ring 20 for severing the gobs as they are formed.

With reference to Figure 7 of the drawings, the orifice ring 20, the solid block 10, feeding chamber 11, inlet passage 12 and the surrounding heating passages 25, 26, and the passage 19 of the stack 18, are precisely the same as that shown in Figure 2 of the drawings, but the flow of the glass to the gathering chamber is controlled in a different manner than by the gate 28 of Figure 2 of the drawings.

In Figure 7, a cylindrical stem 31 is disposed in the opening 17 of the feeder boot and is provided with an extension 32 that projects into a vertical passage 33 communicating with the feed passage 12, and the mass of glass in the forehearth structure.

A flange 34 is provided on stem 31 to constitute an abutment for a flat shoulder portion 35 provided on the top of the block 10 so that the feed passage 12 may be entirely cut off from the source of glass supply 27.

With reference to Figures 2 and 7 of the drawings, the feeding chamber 11, through its vertically extending passage, is connected to a conduit 36 leading to a source of positive and negative pressures which are alternately communicated to the feeding chamber 11 to act upon the glass within the gathering chamber in the following manner.

Briefly describing the operation of the above described feeder, attention is directed to Figures 4 to 6 inclusive of the drawings in which it is to be noted that the volume of the gathering chamber between the top of the passage 12 and the bottom of ring 20 is relatively small. In Figure 4, the glass is shown as flowing in a stream 37 from the orifice ring 20, the stream partially filling the discharge orifice so that the impulses transmitted to the feeding chamber 11 are not effective in any manner upon the glass flowing from the supply 27 through the feeding passage 12 to the discharge orifice 13.

The gate 28 is adjusted to permit sufficient glass to flow through the passage 12 into the gathering chamber at the bottom of the feeding chamber 11 to the discharge orifice 13 to almost fill said orifice as shown in Figure 5 of the drawings. When the orifice 13 is substantially filled with the flowing glass 37, the vacuum in the feeding chamber 11 will be effective in sealing the orifice 13 and drawing the glass into the gathering chamber as shown at 38, in Figure 6. Upon the subsequent application of the pressure impulse, the glass will be extruded in the form of a gob from the feeding chamber 11. At this stage of the operation, the shear mechanism 30 is placed in operation and the gob is severed. Subsequent impulses will produce a gob, the size and shape of which can be regulated by minor adjustments of the gate 28 and without regulating the impulse mechanism.

Such minor adjustments as are necessary for regulating the weight of the gob may also be made by regulating the impulses communicated to chamber 11 without adjusting gate 28.

The mass or weight of the gob is primarily controlled by the size of the feeding orifice which is established by practice. In other words, the size of the feeding orifice 13 determines the size of the stream of glass 37 which can be regulated by gate 28 within comparatively small limits.

The working head of the glass in chamber 11 should be maintained at the level of the top of passage 12 and it has been found that control of the extruded gob is most effectively obtained when the volume of glass in the gathering chamber at the completion of the suction impulse does not exceed substantially double the volume of the extruded gob.

The feeding of the glass in the present type of feeder is largely by gravity as the impulses of the feeding chamber do not, to any appreciable extent, either increase or retard the flow of the glass through the feeding passage 12, though the flow may be retarded or quickened at the instance of application of the impulses.

It is apparent that the success of applicant's feeder depends on the proper carrying out of the feeding principles as described in connection with Figures 4 to 6 of the drawings, and the uniformity in the quality of the glass passing into and from the feeding chamber. By withdrawing the glass from the bottom of the forehearth and by means of the heating passages surrounding the lower portion of the feeder block, and orifice ring, and by employing the relatively thick mass of refractory around the feeding chamber which acts as a temperature stabilizer, such uniformity of glass quality is readily maintainable.

In the type of flow control valve employed in Figure 7 of the drawings, the flow by gravity to the feeding chamber 11 is controlled by varying the resistance of the flow to the stem 32, this being accomplished by adjusting the stem vertically so that the portion 32 extends a greater or lesser distance into the vertical passage 33 leading to the feed passage 12. If, for example, the stem 32 is entirely withdrawn from the vertical passage 33, the glass will flow freely into the feeding chamber 11, and if a small feeding orifice were used the feeding chamber would gradually fill with glass and the impulses directed to the chamber would be active on the glass mass somewhere above the feed passage 12 instead of in the region of the feeding orifice 13. By lowering the stem 32 into the passage 33, a resistance to the flow is set up which is increased by the amount or distance the stem 32 is projected into the passage 33, thereby obtaining a control of the flow similar to the control effected through the gate 28 as explained in connection with Figures 4 to 6 of the drawings.

From the foregoing description of the operation of the device, it is evident that there are three outstanding principles which effect the shaping and control of the gob, these being the delivery to and maintenance of a constant thermal quality of the glass within the feeding chamber and directly within and above the feeding orifice by the location of the feed passage at the bottom of the hearth, the effect of the stabilization of the refractory mass, and the heating passages around the refractory block and orifice ring; second, the utilization of a minimum glass mass within the feeding chamber; and third, the control of the flow of glass from the supply source to the feeding chamber to an amount equal to substantially the flow necessary to fill the discharge orifice.

It is apparent from the foregoing description of this invention that applicant has devised a feeder which eliminates the complicated regulating mechanisms of the prior art thereby largely reducing the errors which may creep into the operation of a glass feeder, and has further provided means for maintaining uniform quality, quantity and shape of glass segregations.

To vary the size of the gob, it is only necessary to close gate 28, drop the hinge bracket 21, and remove the bushing 20. An orifice ring having a larger or smaller orifice, as the case may be, is then inserted in the hinge bracket 21 which is raised to the position shown in the several figures of the drawings, the impulse mechanism is energized, and the gate 28 or the stem 31 is readjusted to cause a flow of a greater or lesser amount of glass through the passage 12 until the orifice is just filled.

Although several embodiments of the invention have been herein illustrated and described, it will be obvious to those skilled in the art that various modifications of the form of device herein disclosed may be effected within the scope of this invention.

I claim:

1. Apparatus for segregating mold charges from a mass of molten glass comprising a closed feeding receptacle of refractory material having a feeding chamber, a glass inflow passage, and a feeding orifice, and a muffle chamber enveloping substantially the entire receptacle and constituting a flue passage for a gaseous heating medium.

2. Apparatus for segregating mold charges from a mass of molten glass comprising a feeding receptacle consisting of a refractory block having a feeding chamber therein, a glass inflow passage for said chamber, and a discharge passage leading from said chamber, an orifice ring adjacent the discharge passage, and a heating chamber surrounding said receptacle having communication through a passage with a stack, said communicating passage surrounding the orifice ring.

3. The method of segregating mold charges from a mass of molten glass which comprises feeding glass to a submerged feeding orifice from a source in a stream of substantially such volume as to fill said feeding orifice, applying alternate pressure and vacuum impulses to the glass above said orifice to extrude a portion of the glass in the form of a gob of predetermined weight while maintaining the volume of the flow from the source of glass supply the relative periodicity and the intensity of the impulses and the volume of the glass above the feeding orifice substantially constant to extrude successive gobs of uniform weight and shape, and maintaining the glass in and above said feeding orifice at substantially constant temperature.

4. The method of segregating mold charges from a mass of molten glass, which comprises directing a flow of glass to an impulse chamber and through a feeding orifice therein, controlling the rate of flow to the impulse chamber so that the glass flowing to and through the feeding orifice will be of a volume sufficient only to seal said orifice, applying a negative pressure impulse to the glass flowing through the feeding orifice to interrupt the flow through the orifice at the instant of sealing of the feeding orifice, and drawing the glass into the impulse chamber, then applying a positive pressure impulse to the glass to extrude the glass from the impulse chamber in the form of a gob suspended below the feeding orifice and severing the gob while hanging freely in suspension.

5. The method of segregating mold charges from a mass of molten glass which comprises directing a flow of glass to an impulse chamber having refractory walls of substantial mass and through a feeding orifice therein, enveloping the refractory walls of the impulse chamber in a regulable heating medium to maintain the refractory wall of said chamber at substantially constant temperature, controlling the rate of glass flow to the impulse chamber so that the glass flowing to and through the feeding orifice will be of a volume sufficient only to seal said orifice, applying a negative pressure impulse to the glass flowing through the feeding orifice to interrupt the flow through the orifice at the instance of sealing of the feeding orifice and draw the glass into the impulse chamber, then applying a positive pressure impulse to the glass to extrude the glass from the impulse chamber in the form of a gob suspended below the feeding orifice and severing the gob while hanging freely in suspension.

GEORGE R. HAUB.